March 15, 1966     C. PRISTER, JR     3,240,107
VIEWFINDER WITH LONG EYE RELIEF HAVING
FRAMING AND CENTERING MEANS
Filed Sept. 5, 1961     2 Sheets-Sheet 1
PRIOR ART
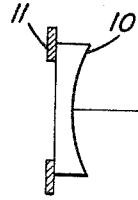
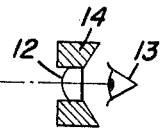
Fig. 1
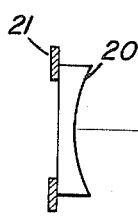
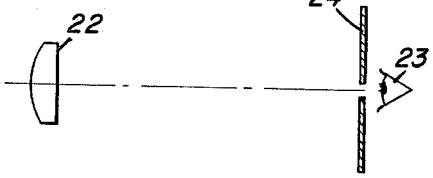
Fig. 2
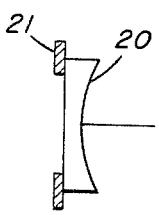
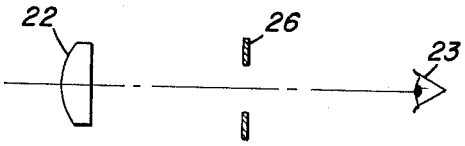
Fig. 3
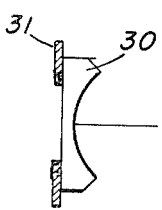
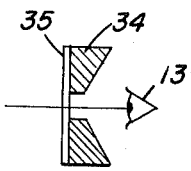
Fig. 4
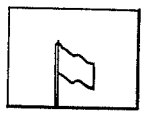
Fig. 5     Fig. 6
CHARLES PRISTER JR.
INVENTOR.
BY *R. Frank Smith*
*F.M. Emerson Holmes*
ATTORNEYS March 15, 1966   C. PRISTER, JR   3,240,107
VIEWFINDER WITH LONG EYE RELIEF HAVING
FRAMING AND CENTERING MEANS
Filed Sept. 5, 1961   2 Sheets-Sheet 2
PRIOR ART
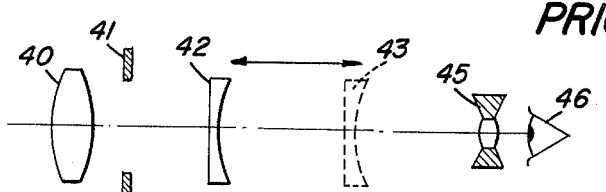 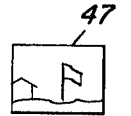 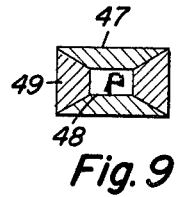
Fig. 7   Fig. 8   Fig. 9
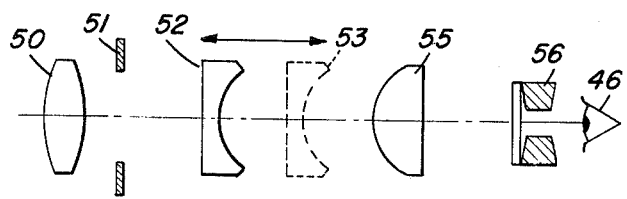 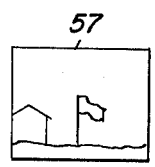 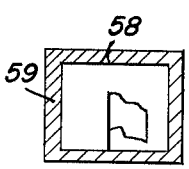
Fig. 10   Fig. 11   Fig. 12
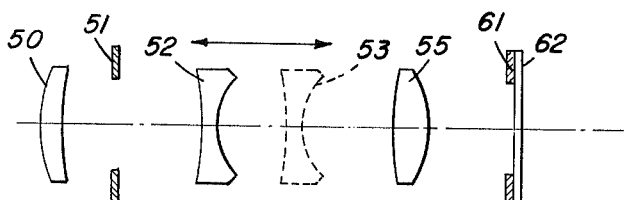 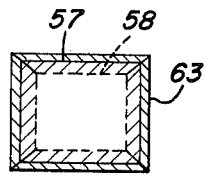
Fig. 13   Fig. 14
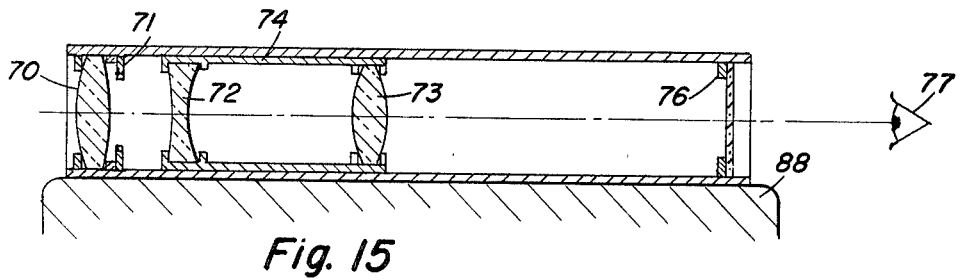
Fig. 15
CHARLES PRISTER JR.
INVENTOR.
BY R. Frank Smith
   F. M. Emerson Holmes
ATTORNEYS United States Patent Office
3,240,107
Patented Mar. 15, 1966

3,240,107
VIEWFINDER WITH LONG EYE RELIEF HAVING FRAMING AND CENTERING MEANS
Charles Prister, Jr., Rochester, N.Y., assignor to Eastman Kodak Company, Rochester, N.Y., a corporation of New Jersey
Filed Sept. 5, 1961, Ser. No. 135,916
5 Claims. (Cl. 88—1.5)

This invention relates to viewfinders and particularly to viewfinders of the inverted Galilean type consisting of a negative objective system and positive eye lens which approximately collimates light received through the negative objective from the subject being veiwed.

The present invention provides long eye relief and this in turn permits (1) increased magnification, (2) flexibility during camera design (3) the ability to use a single sysem on cameras having different basic dimensions and (4) the use of a small front window opening. Thus all of these constitute objects of the present invention and are inherent in the main object which is to permit long eye relief, that is to permit the eye to be located at a substantial distance behind the eyepiece. Just how the long eye relief leads to the four itemized objects is not obvious and will be explained in detail in connection with the accompanying drawing.

It is customary in viewfinder systems to have some means for defining the field of view. This frame defining means is commonly located near the negative objective and may consist of a rectangular metallic frame, the term rectangle including square. It is customary in such systems to avoid parallax or erroneous framing by having a small eyepiece so that the eye of the observer is confined to an axial position. However, this is objectionable since it confines the position of the observer's eye longitudinally as well as transversely. That is, the observer must place his eye very close to the eyepiece, so close in fact that those wearing spectacles sometimes find it objectionable and are unable to see all of the viewfinder frame at one time. Furthermore many viewfinder systems are mounted on cameras so that it is inconvenient for the observer to place his eye close to the eyepiece. This is particularly true with variable power viewfinders designed to present fields of view corresponding to wide angle and telephoto or zoom systems.

The eye (relief) distance is large but the exact value is not critical. Nevertheless the invention is most useful when it is possible for the eye to see the full field frame even though the eye is located at a distance behind the eyelens greater than the separation of the eyelens and the front objective. Obviously with ordinary viewfinders, the eye located at this distance behind the eyelens would merely see through a small axial portion of the negative objective and would not see the frame at all unless the eye were moved to one side in which case it would see only part of the frame. Since the sole purpose of a viewfinder is to see what field of view is defined by the whole frame, such an arrangement with an ordinary viewfinder would normally be useless. In the present invention this difficulty is overcome by making the eyelens itself relatively large in diameter. There is no point in having it very much greater in diameter than the frame itself since such a large eyelens would permit the eye to be at an infinite distance away and still see all of the field frame. The positive power of the eyelens bends the marginal rays, so that a very large eyelens is like a reading glass and its actual diameter is greater than that of the frame when the eye "at infinity" sees the whole frame. However, the effective diameter of the eyelens, i.e., the diameter which determines whether the corners of the frame can be seen must be at least ½ the diameter or diagonal of the frame if the eye is to be at least as far behind the eyelens as the eyelens is behind the frame. The greater the diameter of the eyelens up to a value slightly greater than that of the frame, the farther back the eye may be positioned and still see all of the frame.

On the other hand, such a large diameter eyelens means that some or all of the field frame can still be seen when the eye moves laterally away from the optical axis of the viewfinder. When the eye is off axis the field of view seen through the frame is no longer the proper one, i.e. no longer corresponds to the field being photographed by the camera with which the viewfinder is associated. For example, if one places his eye below the axis of the viewfinder and looks at a person, he may see the head of the person in the viewfinder, but this head may be above the field being photographed by the camera lens and would not be seen through the veiwfinder if the eye were located on the axis thereof. According to the present invention this difficulty is overcome by including means behind the eyelens for insuring that the eye stays on the axis. One simple way of doing this is to use an apertured member with a small axial aperture so that the eye can see all of the frame line when located at the aperture but which obstructs the view of at least part of the frame if the eye is moved laterally. Alternatively and preferably, a second framing device may be used in this location (behind the eyelens) so that the eye properly located sees the rear frame surrounding the front frame and concentric therewith, but this concentricity is disturbed if the eye is moved off axis.

The advantages of the invention, the manner in which it accomplishes each of the above objects, and its application to various systems requiring a long eye relief, will be fully understood from the following description of preferred embodiments of the invention when read in connection with the accompanying drawings in which:

FIG. 1 illustrates in conventional manner a standard viewfinder of the inverted Galilean telescope type.

FIGS. 2, 3 and 4 similarly illustrate simple embodiments of the present invention.

FIGS. 5 and 6 represent the fields of view as seen through the viewfinders of FIGS. 1 and 4 respectively.

FIG. 7 illustrates a standard zoom finder, FIGS. 8 and 9 showing the field of view respectively at the wide angle and telephoto settings.

FIGS. 10, 11 and 12 similarly illustrate a zoom finder and its field of view, incorporating the present invention.

FIGS. 13 and 14 similarly illustrate another embodiment of the present invention applied to zoom finders and its fields of view.

FIG. 15 shows still another zoom viewfinder according to the present invention.

In FIG. 1 the optics of a standard viewfinder are shown. It consists of a negative front or objective lens 10 adjacent to which a rectangular frame 11 is located to define the field of view. Light from the subject being viewed passes through the lens 10 and is rendered divergent thereby. This diverging light is collimated or approximately collimated by an eyepiece or eyelens 12 so that it may be conveniently viewed by the eye 13 of an observer. In order to provide precise viewfinding, i.e. to be sure that the eye sees exactly the proper angular field through the frame 11, the eyepiece 12 is made quite small in diameter and if the eye 13 is moved off the axis of the system, its view is blocked by the mount 14 of the eyepiece 12. The eyepiece itself acts as the rear window or dust cover of the system.

If the eye 13 is moved back from the eyepiece 12 any appreciable distance, it is no longer possible for the eye 13 to see all of the frame 11 through the eyepiece 12. The usual compromise is to provide an eyepiece whose diameter is just barely sufficient to see all of the frame when the eye is placed as close to the lens as is reasonably possible. In fact some prior viewfinders do not make provision for those wearing spectacle lenses. If the eyelens 12 is made of larger diameter for ease in locating the eye or to permit the wearing of spectacles, the viewfinder becomes inaccurate since lateral movement of the eye causes it to see a field of view shifted from the proper one.

According to the present invention as illustrated in the FIGS. 2 and 3, the eyelens 22 is made quite large. Its effective diameter is usually greater than half the diagonal of the frame 21 adjacent to the objective lens 20 in this case. The eyelens 22 may be quite large indeed but little is gained when the diameter is very much greater than that of the lens 20.

The eye 23 of the observer may be located quite close to the lens 22 since the light therefrom is approximately collimated or may be placed at some distance from lens 22 as illustrated in FIG. 2. The eye 23 can still see all of the frame 21 through the lens 22 even though the distance of the eye 23 from the lens 22 is equal to or greater than the distance between the lens 20 and 22. This increased eye relief or longitudinal latitude is highly desirable for many purposes. However, some means such as a plate 24 with a small axial aperture must be provided to eliminate the transverse latitude of the eye position. If the eye is moved off axis, the opaque mmeber 24 cuts off the view entirely.

An alternative method for centering the eye 23 on the axis during viewing, is illustrated in FIG. 3 in which a second frame defining means 26 similar in shape and coaxial with the frame 21 is located between the lens 22 and the eye 23. The eye position is such that it can see all of the frame 21 inside the frame 26 and the two frames appear concentric only when the eye is on the axis. Thus the viewing procedure consists of locating the eye so that the two frames 21 and 26 appear concentric, at which time the field of view seen through the frame 21 is the correct one. If the eye moves transversely so that the field of view shifts to an incorrect one, the frame 26 no longer appears concentric with the frame 21.

There is a change in the size of the field seen through the frame 21 as the eye 23 is moved longitudinally. The change is very small and in most cases can be neglected. However, the frame size is selected for the most likely eye position. If the same finder is used on different cameras with the separation of mask 24 and lens 22 different, the mask 21 size is slightly different for the two cases. If the angular coverage of the taking lenses of the two cameras is different, different frame masks would have to be used anyway. In any case, making up different size masks does not involve appreciable cost. There is still the full saving of being able to use the same viewfinder optics on a plurality of different cameras.

In FIG. 4 the invention is applied to a viewfinder having the same overall length as that in FIG. 1. The negative lens 30 in this case has greater negative power and the mask 31 is somewhat smaller size than the mask 11 of FIG. 1. The eyepiece 32 is much closer to the negative objective 30 than is the eyepiece 12 of FIG. 1 to its objective 10, but the eye 13 is still at the same distance and an apertured member 34 acts like the mount 14 of FIG. 1 to keep the eye 13 on axis. The arrangement shown in FIG. 4 has greater magnification than the arrangement shown in FIG. 1 and this is illustrated in FIGS. 5 and 6, the former representing the field seen through the viewfinder of FIG. 1 and the latter representing the field seen through the viewfinder of FIG. 4. Thus FIGS. 4, 5 and 6 illustrate one of the advantages (magnification) of the invention independent of the other advantages.

The other advantages could be added. For example the arrangement shown in FIG. 4 could be used on different length cameras merely by placing the eye stop 34 at different axial positions corresponding to the back of the camera. Alternatively the apertured member 34 could be replaced by a concentric mask corresponding to the frame 26 of FIG. 3.

In all of the embodiments of the invention, it is customary to place a plane window such as 35 near the eye position defining means, to act as the rear window and dust cover of the viewfinder.

FIG. 7 illustrates a simple form of zoom or adjustable viewfinder according to the prior art. The negative objective in this case consists of two lenses, a positive one 40 and a movable negative one 42 shown in the wide angle position. The lens 42 is movable to the position shown by broken lines 43 which constitutes the telephoto setting. A view defining frame 41 is located between the two parts of the negative objective and is fixed in location relative to the positive part 40. A small diameter eyepiece 45 is located very near to the eye position 46. With the negative lens in the position 42 the field of view is that shown at 47, in FIG. 8. As the negative lens is moved to the position 43 the field of view contracts to the size 48 shown in FIG. 9 and there is a long tunneling effect illustrated by the shaded areas 49.

Not only does the present invention give larger magnifications at any one setting, but it reduces the apparent tunneling as one moves from the wide angle to the telephoto position. This latter advantage is illustrated in FIGS. 10, 11 and 12. In this case the objective consists of more powerful lenses 50 and 52 with a frame defining means 51 located therebetween. The eyelens 55 is correspondingly powerful and is located nearer the objective, the negative lens of which moves between the positions 52 and 53. Greater magnification is provided at the wide angle position as shown at 57 in FIG. 11 even though the eye 46 is at greater overall distance from the lens 50 than it is from the lens 40 in FIG. 7. The eye 46 is held on axis by an apertured window 56. As the negative lens 52 is moved to position 53 the telephoto view 58 of FIG. 12 is presented with the tunneling effect indicated by the shaded area 59 much reduced.

Replacing the apertured member 56 of FIG. 10 by a secondary frame 61 and a rear window or dust cover 62 of FIG. 13 permits the eye 46 to be placed even further back. Any small change in angular field of view can be adjusted by using a different size frame means 51. The field of view 57 and 58 is seen in FIG. 14 inside the secondary frame 63 which corresponds to the inside edges of the frame 61.

The gain in magnification between FIG. 11 and FIG. 8 and the gain in magnification between FIG. 6 and FIG. 5 can be as much as 50% without introducing more than 5% change in the size of the frame needed to define the correct field of view. However, the normal variations between observers (due to change in pupil diameter or to the shape and location of the eyeball etc.) is often greater than 5%.

One special advantage of the high magnification and long eye distance features of the present invention is the fact that the objective may be placed at the very front of the camera, which in turn means that a relatively small lens may be used as the objective.

Another special advantage of the invention is illustrated in FIG. 15 in which a zoom viewfinder zooms by moving part of the negative objective and the eyelens as a unit. The negative objective consists of a positive lens 70 and a negative lens 72 with the viewfinder frame 71 located therebetween. The lens 72 is rigidly connected by sliding mount 74 to a large eyelens 73 whose large diameter gives the advantages of the present invention. In this case the eye locating means 76 is similar to the frame 26 and 61 of FIGS. 3 and 10. The eye 77 is located at about ¾ inch behind the camera housing illustrated schematically at 88. This allows the viewfinder objective 70 to be near the front of the camera and the eye to be at considerable distance therefrom without presenting too small an image to the eye and with plenty of room for zooming of the viewfinder, including motion of the eyelens 73 as well as the negative lens 72 of the system.

Example 1

The following is the specification for a viewfinder of the type illustrated in FIG. 15 in which the optical elements are made of methylmethacrylate and having an index of refraction of 1.492 and a dispersive index $V=57.4$.

The front lens 70 has a thickness of .14 inch, a front spherical surface of 3.04 inch radius and a rear surface of —4.72 inch radius. The spacing between the lenses 70 and 72 varies from .25 inch at wide angle position to 1.13 inches at telephoto position.

The lens 72 has a thickness .08 inch, a front surface whose radius of curvature is —2.36 inches and a rear surface which is aspheric with a paraxial radius of .374 inch. The aspheric equation in inches is $x=1.33584y^2+.23451527y^4$, where $x$ is the axial distance from the vertex and $y$ is the height from the axis. The separation between the lenses 72 and 73 is fixed at 1.19 inches since the lens 73 moves with the lens 72 when zooming.

The lens 73 has a thickness of .14 inch, a radius of curvature of 1.29 inches on its front surface and a radius of curvature of —5.21 inches on its rear surface. The total distance from the front of the lens 70 to the rear of the camera 78 is 6 inches and the eye 77 is .75 inch behind the rear of the camera. Thus at the extreme telephoto position the distance between the lens 73 and the eye 77 is over 4 inches which is much greater than the distance between the eyelens 73 and the negative component made up of lens 70 and 72. Thus the present invention provides a precise, inexpensive viewfinder with high magnification located near the front of a camera but still useable with the eye behind the camera at some distance from the eye lens.

Example 2

A specific form of the lens illustrated in FIG. 13, i.e. one in which only the negative lens moves for zooming, is as follows: The magnification varies from .537 at the wide angle position through .710 at normal position to 1.188 at telephoto position. This zoom range corresponds to a camera lens varying from 9.7 to 27.0 mm. focal length.

In this example, the lens 50 is meniscus, the front surface having a paraxial radius of curvature of $+1.242$ inches and being aspheric according to the equation $X=-.40231152y^2-.07481260y^4-.00172612y^6$ where $X$ is axial distance from the vertex (center) of the surface and $y$ is height from the axis. The rear surface of the lens 50 has a radius of curvature of $+18.32$ inches. The movable lens 52 in this example has a concave front surface with radius of curvature —2.00 inches and a rear surface which is aspheric with a paraxial radius of curvature of $+0.612$ inch and an axial section according to the equation $$X=-.81681728y^2-.80883353y^4+3.30166055y^6$$

The lens 55 has a convex front surface with a radius of curvature $+18.19$ inches and a rear surface convex to the rear with a radius of curvature —1.84 inches. In this example, the distance from the lens 55 to the eye 46 is about 2.7 inches and the frame 61 with the window 62 is located at about 1.4 inches from the lens 55; neither of these latter spacings is critical.

One special advantage of such a system is that it can be used with different eye distances and hence the same viewfinder can be used on various camera designs without changing the design of the viewfinder. For example the same optics can be mounted on a camera only 4 inches long merely moving the secondary frame 76 forward, shortening the housing and making a slightly smaller frame 71 if precisely the same angular field is to be covered.

Having thus described the preferred embodiments of my invention it is pointed out that it is not limited thereto but is of the scope of the appended claims.

I claim:

1. A viewfinder comprising in axial alignment a negative objective, means adjacent to the negative objective for defining a rectangular frame, a positive eyepiece for receiving light from the subject being viewed through the objective and for approximately collimating said light and means with an axially centered rectangular aperture behind the eyepiece a distance at least half of, and at most equal to, the separation of the objective and the eyepiece for automatically identifying, to an observer whose eye is held at a distance from the eyepiece greater than the separation of the objective and eyepiece, when said eye is substantially on axis, said eyepiece having a diameter not substantially greater than that of the negative objective and at least one-half the diagonal of said rectangular frame such that all of said frame is visible therethrough by said eye, on axis at said distance.

2. A viewfinder according to claim 1 in which the negative objective consists of a positive and a negative part relatively movable to vary the apparent angular field defined by the frame means.

3. A viewfinder according to claim 1 in which said identifying means is a secondary rectangular frame defining member oriented to appear outside, concentric with, similar shape to and oriented the same as, the first mentioned frame means when viewed by said eye on axis.

4. A viewfinder according to claim 1 mounted on a camera and in which the negative objective consists of a positive part fixedly mounted at the front of the housing of said camera and a negative part relatively movable to vary the apparent angular field identified by the frame means and in which said identifying means is mounted adjacent to the rear of said camera housing and is a secondary rectangular frame defining member oriented to appear outside and concentric with the first mentioned frame means when viewed by said eye on axis.

5. A viewfinder according to claim 4 in which the eyepiece is fixedly mounted relative to said negative part and moves therewith.

References Cited by the Examiner

UNITED STATES PATENTS

| | | | |
|---|---|---|---|
| 547,243 | 10/1895 | Colvin | 88—32 |
| 1,879,412 | 9/1932 | Mueller | 88—1.5 |
| 2,135,963 | 11/1938 | Crumrine | 88—1.5 |
| 2,552,940 | 5/1951 | Cornut | 88—1.5 |
| 2,590,164 | 3/1952 | Fairbank | 88—1.5 |
| 2,771,810 | 11/1956 | Sommer et al. | 88—1.5 |
| 2,859,654 | 11/1958 | Back | 88—1.5 |
| 2,945,419 | 7/1960 | Bechtold et al. | 88—57 |

FOREIGN PATENTS 294,713    2/1954    Switzerland.

DAVID H. RUBIN, *Primary Examiner.*